(12) United States Patent
Iwamoto et al.

(10) Patent No.: US 7,525,826 B2
(45) Date of Patent: Apr. 28, 2009

(54) SWITCHING POWER SUPPLY APPARATUS AND METHOD

(75) Inventors: Hoichi Iwamoto, Hamamatsu (JP); Hiroshi Emoto, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 162 days.

(21) Appl. No.: 11/787,215

(22) Filed: Apr. 13, 2007

(65) Prior Publication Data

US 2007/0247132 A1    Oct. 25, 2007

(51) Int. Cl.
  *H02H 7/122*  (2006.01)
  *H02M 3/335*  (2006.01)
(52) U.S. Cl. ............... 363/56.1; 363/16; 363/56.01
(58) Field of Classification Search ........... 363/16, 363/20, 21.01, 21.04, 50, 55, 56.01, 56.09, 363/56.1, 56.12, 95, 97, 131
  See application file for complete search history.

(56) References Cited

U.S. PATENT DOCUMENTS

| | | | | |
|---|---|---|---|---|
| 5,581,451 A | * | 12/1996 | Ochiai | 363/21.16 |
| 5,917,715 A | * | 6/1999 | Lee | 363/21.04 |
| 6,577,510 B1 | * | 6/2003 | Yasumura | 363/21.02 |
| 6,985,369 B2 | * | 1/2006 | Kunii | 363/19 |
| 7,170,761 B2 | * | 1/2007 | Yasumura | 363/17 |
| 7,466,567 B2 | * | 12/2008 | Yang | 363/17 |

FOREIGN PATENT DOCUMENTS

| | | |
|---|---|---|
| JP | 09-023638 | 1/1997 |
| JP | 09-271165 | 10/1997 |
| JP | 11-055943 | 2/1999 |
| JP | 2000-341951 | 12/2000 |
| JP | 2004-236059 | 8/2004 |
| JP | 2004-236413 | 8/2004 |
| JP | 2005-237067 | 9/2005 |

* cited by examiner

*Primary Examiner*—Matthew V Nguyen
(74) *Attorney, Agent, or Firm*—Foley & Lardner LLP

(57) ABSTRACT

Configurations provide reduction in the hum and the weak shocks that are produced in audio equipments where electrical power is supplied. Switching electrical power sources include, a rectification element that rectifies a current that is supplied, a switching element that switches the input voltage that has been rectified by the rectification element, an oscillator circuit that oscillates at a specified frequency and drives the switching element by means of oscillation, and a transformer with which the voltage that has been switched by the switching element is input to the primary oil and wherein an electrical power source output is obtained from a secondary coil. A plurality of capacitors are connected to the conductors.

18 Claims, 2 Drawing Sheets

SWITCHING POWER SUPPLY APPARATUS AND METHOD

CROSS-REFERENCE TO RELATED PATENT APPLICATIONS

The present invention relates to Japan Patent Application 2006-117332, filed on Apr. 21, 2006, which is incorporated herein by reference in its entirety and which forms a basis for priority.

BACKGROUND OF THE INVENTION

1. Field of the Invention

Embodiments of the present invention relate to switching electrical power source devices and methods, and in particular to such devices and methods that reduce the hum that is produced in audio equipment.

2. Description of the Related Art

In recent years, there has been a significant progress in the computerization of control systems for switching electrical power source devices. They have become lighter and smaller, and are widely used as the electrical power sources for electronic and electrical devices. An important problem that has been studied involves designing circuits with switching electrical power sources in which the Electro-Magnetic Interference (EMI) noise is reduced.

For example, the Japanese Patent Application Publication (Kokai) Number 2004-236059 describes a noise filter circuit that is used with switching electrical power source devices. FIG. 2 is a block diagram that shows the circuit configuration of a typical switching electrical power source device. The switching electrical power source device 10 comprises an input section 11, a noise filter section 12, a rectification and smoothing section 13, and a converter section 14. An alternating current voltage is input to the input section 11. The external noise that has entered from the input side is eliminated by the noise filter section 12, and then it is rectified and smoothed by the rectification and smoothing section 13. It is then converted into a specified direct current voltage by the converter section 14, and then it is outputted.

A commercial alternating current of, for example, 100 V is supplied to the input section 11 from a commercial alternating current power source and from an alternating current supply line comprising a hot conductor L and a neutral conductor N. A fuse F11 for excess current protection is connected to the hot conductor L.

In the noise filter section 12, a capacitor C11 for the reduction of high frequency noise is connected between the hot conductor L and the neutral conductor N. In the stage following that, a line bypass capacitor C13 for the reduction of high frequency noise is connected between the hot conductor L and a frame ground FG. Together with this, a line bypass capacitor C14 for the reduction of high frequency noise is connected between the neutral conductor N and the frame ground FG.

In the following stage, the choke coil L11 (for the elimination of the common mode noise) is connected between the hot conductor L and the neutral conductor N. In the stage following that, the choke coil L11 and capacitor C12 is connected between the line hot conductor L after the fuse F11 and the neutral conductor N. In addition, in the following stage, a line bypass capacitor C15 is connected between the hot conductor L and the frame ground FG. Together with this, a line bypass capacitor C16 is connected between the neutral conductor N and the frame ground FG.

The line bypass capacitors C13, C14, C15, and C16 in the noise filter section 12 eliminate the common mode noise that is generated by the current that flows through the parasitic capacitor between the collector or the source of the switching element in the DC-DC converter and the frame ground FG.

The alternating current that has passed through the noise filter section 12, after being rectified by a diode bridge D11 in the rectification and smoothing section 13, is smoothed by a capacitor C17 in the rectification and smoothing section 13, and thus becomes an a stable direct current voltage. The a stable direct current voltage is stabilized by the DC-DC converter in the converter section 14, and then becomes a specified direct current voltage for output.

In FIG. 2, in order to simplify the explanation, details of several circuits such as the oscillation start circuit, the oscillator circuit, and the protection circuit have been omitted.

SUMMARY OF THE DISCLOSURE

With the type of switching electrical power source device that was described above, it is possible to eliminate a constant line noise, but there is still a hum present that comes from the commercial alternating current power source. The hum can be mixed in with the sound that is output from the speakers when this electric power is supplied. In such audio equipments, the ground of the secondary circuit is connected to a metal panel. Because there is a minute shocking current that is lower than the leakage current limit value that is demanded by safety regulations, when the metal panel is touched, a weak shock can occur that imparts an uncomfortable tingling or prickling feeling.

According to certain embodiments of the invention described herein, both the hum and the weak shocks can be reduced.

One of the embodiments of the present disclosure includes a switching electrical power source device that includes: 1) a rectification element that rectifies a current that is supplied by a current supply line, 2) a switching element that switches the input voltage that has been rectified by the rectification element, 3) an oscillator circuit that oscillates at a specified frequency and drives the switching element by means of the oscillation, and 4) a transformer with which the voltage that has been switched by the switching element is input to the primary coil. The electrical power source output is obtained from the secondary coil. The switching electrical power source device includes a first capacitor, one end of which is connected to the hot conductor of the current supply line, and a second capacitor, one end of which is connected to the neutral conductor. The other end of the first capacitor and the other end of the second capacitor are connected to each other. Their connection point then is connected to the ground conductor on the secondary side that is connected to the secondary coil.

In a second embodiment, the capacitances of the first capacitor and the second capacitor of the switching electrical power supply are roughly the same.

Furthermore, in a third embodiment, the switching electrical power source devices is furnished with a third capacitor that is connected to the ground conductor of the primary side of the transformer and the ground conductor of the secondary side.

Here, the conductors that are at the operating reference potential in the circuit, are called the ground conductors. As such, they are to be differentiated from the grounding conductors that are grounded to the earth.

A first embodiment as described above, has an advantage that it can reduce or prevent the hum that is generated in audio equipment to which an electric power is supplied. Furthermore, the weak shock that are provided when the metal panel of the equipment is touched, can be further reduced. Because the ground on the secondary side is connected to the ground of the external equipment that is connected on the secondary side, the impedance of the external equipment is lowered due to the fact that the first and second capacitors are connected to the ground on the secondary side. Therefore, the first embodiment presented above not only can reduce the hum, but it can also reduce the leakage current due to the switching noise.

According to a second embodiment as described above, in addition to having the same advantages as was outlined by the first embodiment, it can also improve the reduction of common mode noise. By making the capacitance of the first capacitor and the second capacitor the same, a hypothetical midpoint potential is formed at the connection point of the first capacitor and the second capacitor. Because the connection point is connected to the ground conductor on the secondary side, the impedance of the ground on the secondary side can be reduced.

According to a third embodiment as described above, in addition to having the advantages outlined for the other embodiments there is the advantage that it is possible to reduce the switching noise that is generated on the primary side.

DETAILED DESCRIPTION

Example embodiments of the present invention are described here in detail with reference to the attached drawings.

Figure 1:
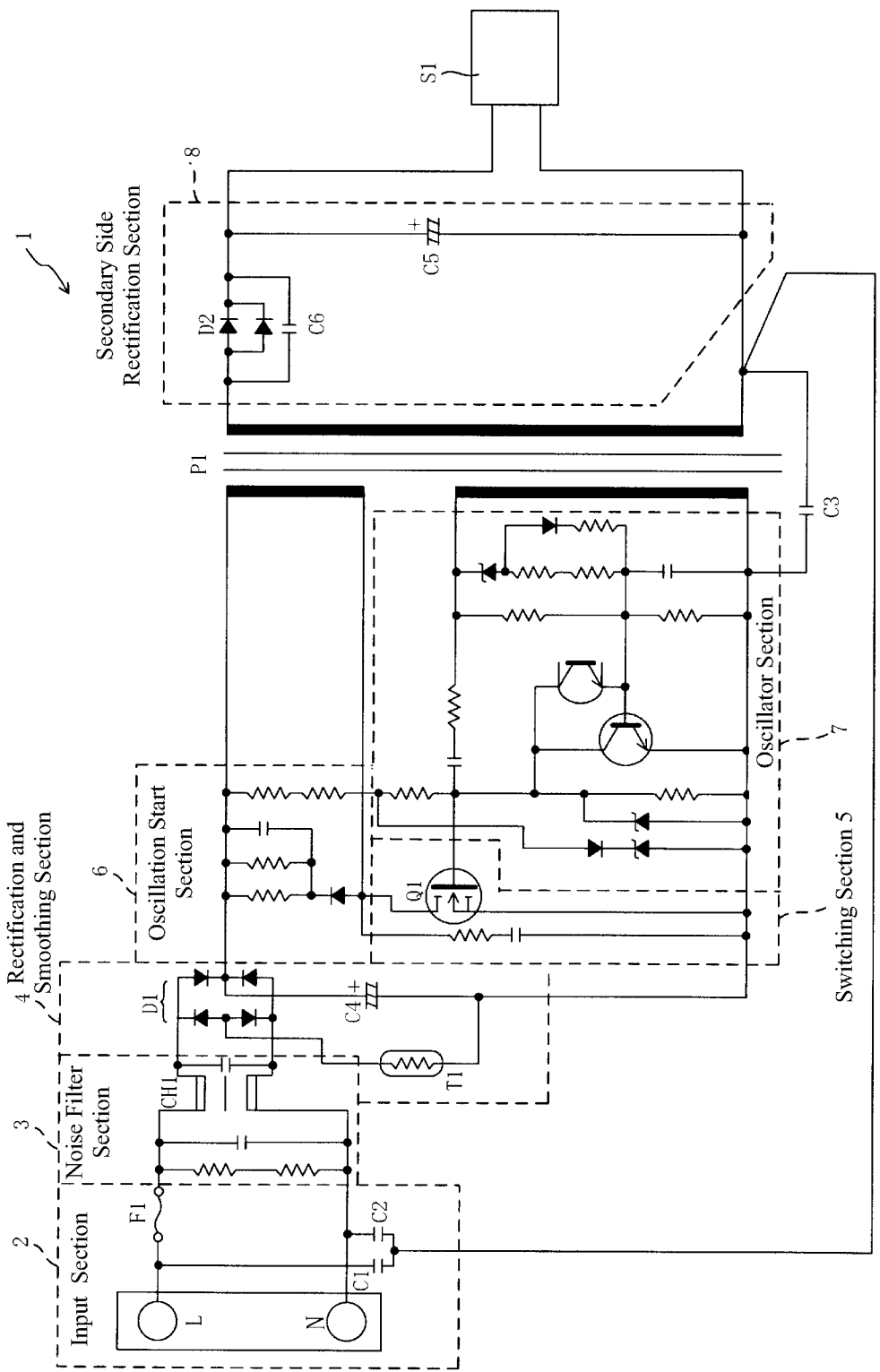
FIG. 1 is a block diagram that shows an electrical configuration of a switching electrical power source device according to an embodiment of the present invention.
Figure 2:
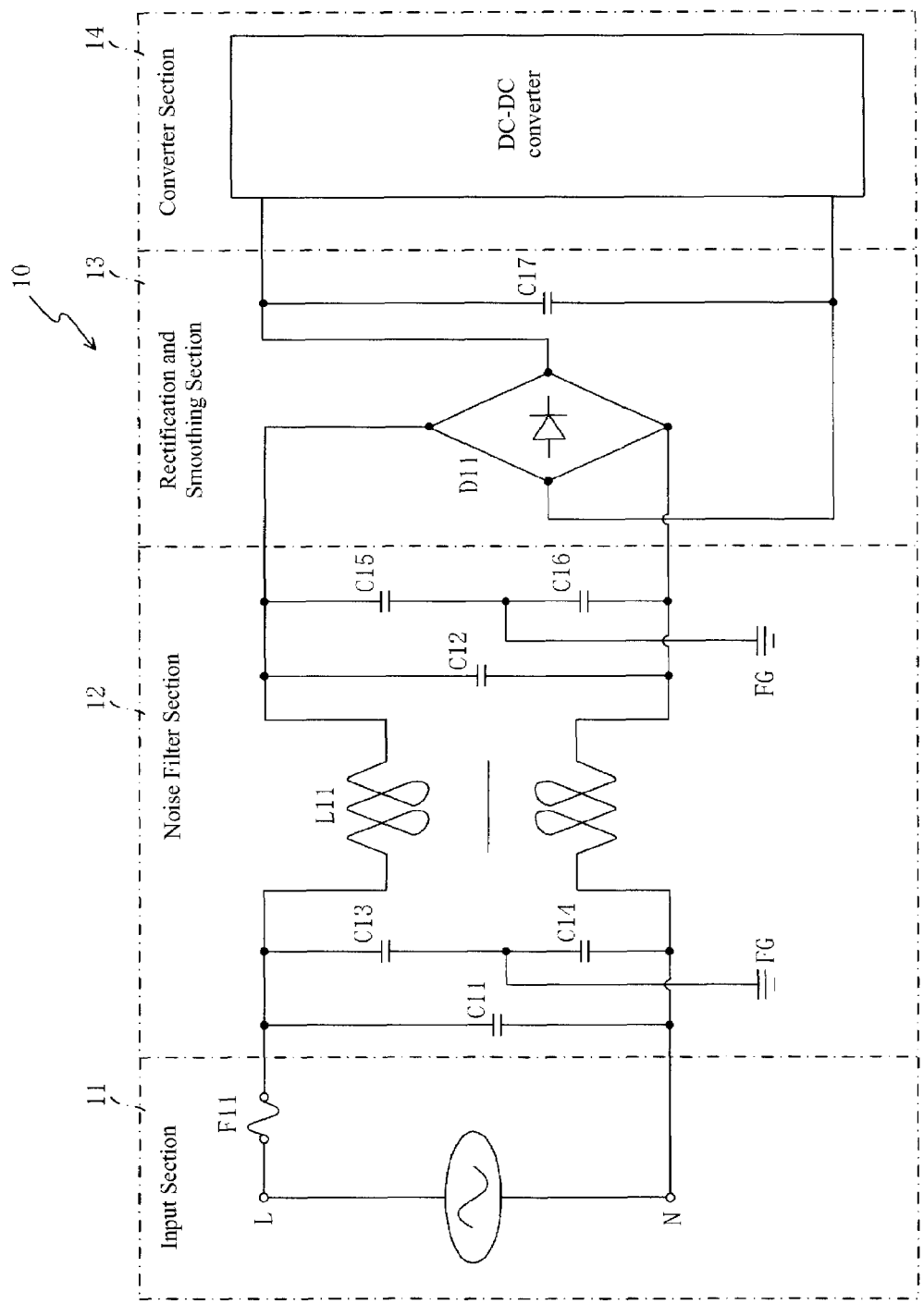
FIG. 2 is a block diagram that shows an example of a conventional switching electrical power source device.

FIG. 1 is a block diagram that shows an electrical configuration of a switching electrical power source device 1, according to a first embodiment of the present invention. As is shown in FIG. 1, the switching electrical power source device 1 includes an input section 2, a noise filter section 3, a rectification and smoothing section 4, a switching section 5, an oscillation start section 6, an oscillator 7, a transformer P1, and a secondary side rectification section 8.

An alternating current voltage that is input to the input section 2, an output on the line of the external noise that is entered from the input side, and a noise that is generated by the switching section 5, are filtered by the noise filter section 3. After being rectified and smoothed by the rectification and the smoothing section 4, the voltage is switched by the switching section 5 and the voltage conversion is carried out on the secondary side by the transformer P1. The oscillation start section 6 is a circuit that supplies an electric power for oscillation to start by the oscillator section 7 when the power to the switching electrical power source device 1 is turned on. Once the oscillation starts, the oscillator section 7 drives the switching section 5.

The switching section 5 switches the voltage that is supplied from the rectification and the smoothing section 4, and a high frequency alternating current voltage is supplied to the primary side of the transformer P1. When an alternating current is supplied to the primary side of the transformer P1, an alternating current is produced on the secondary side. A voltage is also generated in the oscillator section 7, and the oscillation continues. The voltage that has been produced on the secondary side of the transformer P1, is rectified and smoothed out, and is supplied to the audio equipment.

In the input section 2, the commercial alternating current power of, for example, 100 V is input from the alternating current supply line that comprises the hot conductor L and the neutral conductor N. One end of each of the line bypass capacitors C1 and C2 is connected to the hot conductor L, and the neutral conductor N. The other ends of these capacitors are connected together, and their connection point is connected to the ground conductor of the secondary side circuit.

These capacitors reduce the high frequency noise and as a result, it is possible to reduce the generation of the hum from the frequency of the commercial electric power source (for example, 50 Hz or 60 Hz). In addition, by connecting these capacitors to the ground conductor of the secondary side circuit, it is possible to make the capacitance of the capacitor C3 smaller. Accordingly, the weak shock can be reduced or prevented, in those cases where the panel of the equipment (that is connected to the ground conductor on the secondary side) is touched.

The fuse F1 is connected in a stage following the line bypass capacitor C1 and the line bypass capacitor C2. The capacitances of the capacitors C1 and C2 are made roughly of the same value in the range of 470 pF to 100 pF.

In the noise filter section 3, a capacitor and a resistor for reducing high frequency noise are connected between the hot conductor L and the neutral conductor N. In the following stage, the choke coil CH1 is connected and the noise of the common mode component is eliminated. A capacitor is also connected between the hot conductor L and the neutral conductor N in the stage following the choke coil CH1. It is then connected to the rectification and smoothing section 4.

In the rectification and smoothing section 4, a bridge is formed by four diodes. The positive pole that has been rectified is connected to the oscillation start section 6. It is connected to one end of the primary side winding of the switching transformer P1, and the positive electrode of the electrolytic capacitor C4. The negative electrode of the electrolytic capacitor C4 is connected to the ground conductor on the primary side. In addition, the negative pole of the bridge is connected to the ground conductor on the primary side through a thermistor. A thermistor is a device in which the value of the resistance changes (for example, becomes higher) as the temperature increases. It is affixed to the heat sink and the like that is attached to the switching element. Accordingly, in those cases where an abnormality due to a short circuit or a failure of a component and the like occurs, and the temperature of the switching element rises, the resistance value increases, and the flow of current is prevented.

The oscillation start section 6 is a circuit that supplies an electric power such that the oscillation is started by the oscillator at the time that the power source to the switching electrical power source device 1 is turned on. The oscillator section 7 may include an oscillator circuit that oscillates at a high frequency. The output of the oscillator is connected to the gate electrode of the field effect transistor Q1, which is a switching element, and drives the field effect transistor on and off.

The drain electrode of the field effect transistor Q1 is connected to the other end of the primary side winding of the switching transformer P1. The source electrode of the field effect transistor Q1 is connected to the ground conductor on the primary side. When the field effect transistor Q1 is turned on and off, current flows in the primary side of the switching transformer P1 and an alternating current having a specified voltage is produced on the secondary side of the transformer P1. Together with this, an electric power is supplied to the oscillator section 7, and the stable oscillation continues in the oscillator section 7.

The secondary side includes the diode D2 that rectifies the alternating current having a specified produced voltage, and the capacitor C5 that smoothes the current. An electric power having a specified voltage is supplied to the audio equipment that is connected to the secondary side. The capacitor C6 is connected in parallel with the diode D2 and reduces high frequency noise when carrying out the smoothening. With this switching electrical power source, the supply of electric power to various types of equipment such as an AC adapter is possible. A socket S1 may be provided for connecting external equipment.

The capacitor C3 is connected between the ground conductor on the primary side and the ground conductor on the secondary side. Since this capacitor C3 discharges the noise that accompanies the switching operation, the capacitor is effective for reducing EMI.

As discussed above, in the embodiment involving the switching electrical power source device 1, since one end of each of the line bypass capacitors C1 and C2 is connected to the hot conductor L and the neutral conductor N, the other ends are connected together, and the connection point is connected to the ground conductor of the secondary side circuit, the noise that accompanies the switching operation is reduced. As a result, it is possible to make the capacitance of the capacitor C3 smaller.

As it was explained above, in the switching electrical power source device 1 in accordance with an embodiment of the present invention, one end of each of the line bypass capacitors C1 and C2 is connected to the hot conductor L and to the neutral conductor N (to which the commercial power source is supplied). The other ends are connected together, and the connection point is connected to the ground conductor of the secondary side circuit. As a result of this circuit configuration, the hum from the frequency of the power source, is reduced. It is also possible to reduce the shock by making the capacitance of the capacitor C3 smaller for those cases where the panel (of the equipment to which the ground conductor on the secondary side is connected) is touched.

The explanation given above are samples of a few possible embodiments of the present invention. The present invention is not in any way limited to the embodiments that were discussed above. Various modifications and changes are possible without diverging from the scope of the present invention.

What is claimed is:

1. A switching electrical power source device comprising:
   rectification electronics that is connectable to a current supply line to rectify a current signal supplied by the current supply line;
   switching electronics that switches the signal rectified by the rectification electronics;
   an oscillator circuit that oscillates at a specified frequency and drives the switching element; and
   a transformer having a primary coil and a secondary coil and configured such that the input voltage that has been switched by the switching element is input to the primary coil, and an electrical power source output is obtained from the secondary coil;
   wherein one end of a first capacitor, and one end of a second capacitor, are connected at a connection point connected to a ground conductor on a secondary side that is connected to the secondary coil; and
   wherein the first capacitor has a second end which is connected to a hot conductor of the current supply line, and the second capacitor has a second end which is connected to a neutral conductor.

2. The device of claim 1, wherein the capacitances of the first capacitor and the second capacitor are about the same.

3. The device of claim 1, further comprising a third capacitor that is connected to a ground conductor of a primary side of the transformer and the ground conductor of the secondary side of the transformer.

4. The device of claim 3, wherein the capacitance of the third capacitor is smaller than the capacitance of the first capacitor or the second capacitor.

5. The device of claim 2, further comprising a third capacitor that is connected to a ground conductor of a primary side of the transformer and the ground conductor of the secondary side of the transformer.

6. The device of claim 5, wherein the capacitance of the third capacitor is smaller than the capacitance of the first capacitor or the second capacitor.

7. A method of making a switching electrical power source, the method comprising:
   providing a rectification element for rectifying a power signal that is supplied by the current supply line;
   operatively connecting a switching element to the rectification element for switching the rectified signal;
   operatively connecting an oscillator circuit to drive the switching element, wherein the oscillator circuit is configured to oscillate at a specified frequency;
   operatively connecting a primary coil of a transformer to receive input voltage that has been switched by the switching element;
   configuring a secondary coil of the transformer to provide an electrical power source output;
   operatively connecting one end of a first capacitor and one end of a second capacitor to a ground conductor on a secondary coil side of a transformer;
   operatively connecting a second end of the first capacitor to a hot conductor of the current supply line, and
   operatively connecting the second end of the second capacitor to a neutral conductor of the current supply line.

8. The method of claim 7, wherein the capacitances of the first capacitor and the second capacitor are about the same.

9. The method of claim 7, further comprising a third capacitor that is connected to a ground conductor of a primary side of the transformer and the ground conductor of the secondary side of the transformer.

10. The method of claim 9, wherein the capacitance of the third capacitor is smaller than the capacitance of the first capacitor or the second capacitor.

11. The method of claim 8, further comprising a third capacitor that is connected to a ground conductor of a primary side of the transformer and the ground conductor of the secondary side of the transformer.

12. The method of claim 11, wherein the capacitance of the third capacitor is smaller than the capacitance of the first capacitor or the second capacitor.

13. A switching electrical power source device connectable to an AC power supply source, the device comprising:
   a rectifier for rectifying a power signal from the AC power supply source to provide a rectified signal;
   switching electronics for switching the rectified signal at a specified frequency;
   a transformer having a primary coil and a secondary coil and connected such that the rectified signal that has been switched by the switching electronics is input to the primary coil, and an output signal is obtained from the secondary coil; and first and second capacitors, wherein one end of the first capacitor and one end of a second capacitor are connected to a ground conductor on a secondary coil side of the transformer; and wherein the first capacitor has a second end which is configured to connect to a hot conductor of the AC power supply source, and the second capacitor has a second end which is configured to connect to a neutral conductor of the AC power supply source.

14. The device of claim 13, wherein the capacitances of the first capacitor and the second capacitor are about the same.

15. The device of claim 13, further comprising a third capacitor that is connected to a ground conductor of a primary side of the transformer and the ground conductor of the secondary side of the transformer.

16. The device of claim 15, wherein the capacitance of the third capacitor is smaller than the capacitance of the first capacitor or the second capacitor.

17. The device of claim 14, further comprising a third capacitor that is connected to a ground conductor of a primary side of the transformer and the ground conductor of the secondary side.

18. The device of claim 17, wherein the capacitance of the third capacitor is smaller than the capacitance of the first capacitor or the second capacitor.

* * * * *